(12) United States Patent
Lim et al.

(10) Patent No.: US 8,590,697 B2
(45) Date of Patent: Nov. 26, 2013

(54) BELT CONVEYOR ASSEMBLY

(75) Inventors: Kok Leng Lim, Singapore (SG); Vijay Tukaram Patil, Singapore (SG)

(73) Assignee: Pteris Global Limited, Singapore (SG)

( * ) Notice: Subject to any disclaimer, the term of this patent is extended or adjusted under 35 U.S.C. 154(b) by 0 days.

(21) Appl. No.: 13/368,691

(22) Filed: Feb. 8, 2012

(65) Prior Publication Data

US 2013/0199900 A1  Aug. 8, 2013

(51) Int. Cl.
*B65G 21/08* (2006.01)

(52) U.S. Cl.
USPC ..................... 198/860.1; 198/861.1

(58) Field of Classification Search
USPC ................. 198/860.1, 861.1, 836.1
See application file for complete search history.

(56) References Cited

U.S. PATENT DOCUMENTS

| | | | | |
|---|---|---|---|---|
| 4,930,623 A * | 6/1990 | Johnson et al. | ............ | 198/860.1 |
| 4,982,835 A * | 1/1991 | Butler et al. | ............... | 198/836.3 |
| 5,186,314 A * | 2/1993 | Clopton | ..................... | 198/860.2 |
| 5,971,137 A * | 10/1999 | Grant et al. | ................ | 198/860.1 |
| 6,666,325 B1 | 12/2003 | Buenning et al. | | |
| 6,889,824 B2 * | 5/2005 | Leisner et al. | ............. | 198/860.1 |
| 6,957,736 B2 | 10/2005 | Bonifer et al. | | |
| 7,152,730 B2 | 12/2006 | Gerke | | |
| 7,735,638 B2 | 6/2010 | Hau et al. | | |

* cited by examiner

*Primary Examiner* — James R Bidwell
(74) *Attorney, Agent, or Firm* — Schwegman, Lundberg & Woessner, P.A.

(57) ABSTRACT

A belt conveyor assembly comprising a pair of elongate profile frames that are mounted in parallel; a conveyor belt positioned in between the profile frames; and a plurality of auxiliary components removably mounted to outer walls of the profile frames at any position along the length of the profile frames; and wherein the surface of the inner walls of the profile frames are planar over their length and height at least in a region where the conveyor belt is positioned.

29 Claims, 12 Drawing Sheets

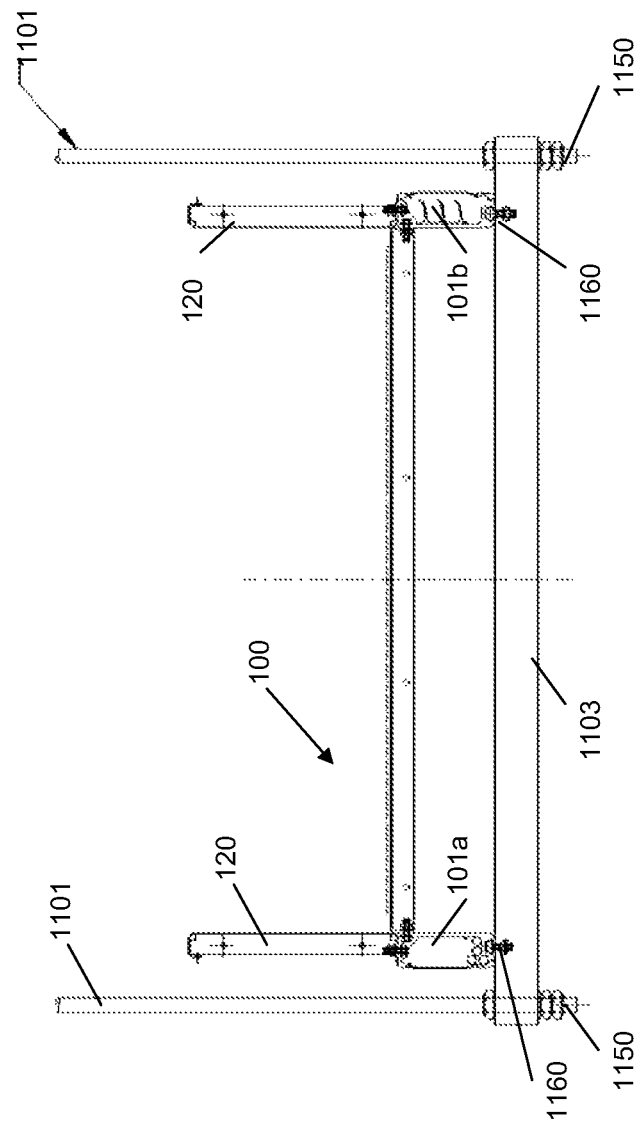

BELT CONVEYOR ASSEMBLY

FIELD OF INVENTION

Embodiments of the present invention relate to a belt conveyor assembly.

BACKGROUND

A conventional belt conveyor assembly consists of a side frame on which auxiliary components are permanently mounted to the side frame as per a particular design. The side frame of a conventional belt conveyor has a "C" shaped cross-section and fabricated by bending or forming a steel sheet. The auxiliary components of a belt conveyor assembly consists of a number of pulleys (e.g. drive pulley, two end pulleys such as head pulley and tail pulley, snub pulley, take up pulley), belt, slider beds, side guards, support legs, cross bracing, drive frame, finger guards, return roller, sensor bracket etc. In addition, a typical belt conveyor assembly has cable trunking to distribute electrical power and communication signal cables. The cable trunking is normally provided below the conveyor body, on a cross brace of the belt conveyor system.

Conventional side frame involves different types of manufacturing processes, such as cutting, bending, drilling, welding, painting, quality checking, etc. These processes are labor intensive and time consuming. Furthermore, the design of a conventional side frame and its auxiliary components are specific to a particular side frame. Therefore, a manufacturer must design a variety of conveyor assembly components, which not only involves manpower and time, but also different manufacturing processes and assemblies which are inconsistent and tedious for quality control.

Furthermore, in some conventional belt conveyor system, the auxiliary components are permanently fixed. It is not possible for example to shift the position of a drive unit along a length of conveyor. In addition, in a conventional belt conveyor system, a drive frame and a take-up frame are independent parts and require an external take-up frame for mounting them on to a drive unit, which complicates the design of the conveyor system and longer time for installation/dismantling/reinstallation processes.

In addition, a conventional belt conveyor assembly requires separate power cable trunkings or wire ways for providing power cables and communication cables, which increase labor and cost.

U.S. Pat. No. 6,666,325 B1 issued to Torsten Buenning et al on 23 Dec. 2003 describes a conveyor track and a load-bearing profile for a conveyor track. The conveyor track has two load-bearing profiles extending substantially parallel. Each load-bearing profile has one longitudinal side, to which a guide profile can be fastened. A rod for supporting rollers is fixable on the load-bearing profile by the guide profile. As a result, the rollers can be simply installed. If no rollers are used, then workpieces or workpiece holders can be slid along slide faces of the guide profile.

U.S. Pat. No. 6,957,736 B2 issued to Edgar Bonifer et al on 25 Oct. 2005 describes a conveyor for transporting load carriers, having load-bearing members which are spaced apart parallel to one another on frame parts and are intended for accommodating drivable load-bearing elements which form longitudinally running load-bearing tracks for the load carriers resting on the load-bearing elements. The conveyor may include modular-construction conveying units, and each load-bearing element of at least two laterally spaced-apart load-bearing members of each conveyor unit may comprise an endlessly circulating load-bearing belt, which bears the load carriers and which is supported on load-bearing rollers mounted on the load-bearing members. The conveyor may be provided for transporting load carriers and may be suitable for conveying the load carriers both longitudinally and transversely.

U.S. Pat. No. 7,152,730 B2 issued to Klaus Gerke describes a conveyor with profiled cheeks consisting of at least one profiled member that is manufactured from light metal and contains longitudinal hollow spaces that are partly realized in the form of sliding block channels, and of a cover for closing a cable channel arranged in the cheek. The profiled member has an L-shaped base cross section with an upper limb that points outward in the operative position, that a sheet metal member is mounted on the base part in order to form the lower limb of the C-shaped base cross section of the cheek, wherein the sheet metal member contains openings that are spaced apart from one another in the longitudinal direction, and that the cover is removably arranged on the two limbs. Cables and lines can lead into and out of the closed cable channel through the openings without having to produce openings on the profiled member or the cover by way of mechanical processing. A two-part cable channel is formed by the upper limb of the C-shaped sheet metal member used.

U.S. Pat. No. 7,735,638 B2 issued to Paul Hau et al describes a conveyor frame assembly that includes a pair of spaced side rails joined by one or more cross supports. Each of the side rails includes a dedicated wire channel and self-contained air flow cavity that enhances the functionality of the conveyor frame assembly. The air flow cavity and the wire channel are formed as part of the side rails separate from typical attachment slots that receive T-shaped connectors. The cross supports utilized with the conveyor frame assembly are attached to the side rails by upper and lower connectors that are each accessible from the top of the conveyor frame assembly. Specifically, the cross support includes a center web and laterally offset attachment webs that allow for easy and convenient construction and field modification of the conveyor frame assembly.

There is thus a need to provide a belt conveyor assembly that seeks to address one or more of the above disadvantages.

SUMMARY

According to an aspect of the invention, there is provided a belt conveyor assembly comprising a pair of elongate profile frames that are mounted in parallel; a conveyor belt positioned in between the profile frames; and a plurality of auxiliary components removably mounted to outer walls of the profile frames at any position along the length of the profile frames; and wherein the surface of the inner walls of the profile frames are planar over their length and height at least in a region where the conveyor belt is positioned.

The auxiliary components may include a plurality of suitably positioned support legs on which the profile frames are mounted; slider beds positioned along the length of the profile frames for supporting the conveyor belt; side guards positioned along the length of the profile frames; a drive unit for driving a drive pulley, wherein the drive pulley drives the conveyor belt; and finger guards mounted to bearings on both the ends of the end pulleys; wherein the support legs, slider beds, side guards, the drive unit and the finger guards are removably mounted to outer walls of the profile frames at any position along the length of the profile frames.

The profile frames may include a substantially C-shaped structure comprising the upright portion; an upper arm, and a lower arm, wherein the interior side each of the profile frame is substantially hollow, wherein on the exterior side each of the upright portion, upper arm and lower arm includes one or more cavities along the length of the profile frames, wherein the cavity on the upright portion is located near the junction of the upper arm and the upright portion, wherein the outer surface upright portion is planar over its length and height at least in a region where the conveyor belt is positioned; wherein each of the plurality of auxiliary components are removably mounted to a respective cavity located on the upper arm, lower arm and the upright portion of the profile frame.

Each of the cavities located on the upper arm, lower arm and the upright portion of the profile frame may have a T-shape cross-section. The cavities located on the upper arm, lower arm and the upright portion of the profile frame may accommodate a bolt for fastening the auxiliary components to the profile frames. The bolt used for fastening the auxiliary components to the upper arm and upright portion may be a standard M8 or 5/16" and the bolt used for fastening the auxiliary components to the lower arm is a standard M10 or 7/16" bolt.

The side guards may be mounted to the upper arm of the profile frame. The slider beds may be mounted to the upright portion of the profile frame. The slider beds may be mounted to the upper arm of the profile frame. The support legs, drive unit, control unit and the finger guards may be mounted to lower arm of the profile frame.

The auxiliary components may further include cross bracing, return rollers, snub pulley and a plurality of identical bottom covers. The cross bracing and bottom covers may be mounted to the lower arm of the profile frame. The return rollers and snub pulley may be mounted to the lower arm of the profile frame.

The hollow sections of the interior side of the profile frames may accommodate power cables and communication signal cables. The power cables may be accommodated in one hollow section of the interior side of the profile frames and communication signal cables are accommodated in another hollow section of the interior side of the profile frames.

Distal end of the upper arm may further include a locator pin, wherein the distal end of the lower arm includes a forked structure, wherein a cover is inserted into the forked structure and locked when the locking pin encounters a slot provided on the upper edge of the cover.

The profile frame may further include a plurality of cavities on the inner or outer walls of the upper arm or the lower arm for mounting an end cover to cover the frame of a last conveyor.

The outer surface of the junction of the upright portion and the lower arm may have a rounded corner for co-operating with the finger guard during mounting. Along the length of the profile frames striped lines may be provided on the outer surfaces of the upright portion and the upright portion of the lower arm.

The slider bed may be mounted to the upright arm at about 10 mm higher than the profile frame. The slider bed may be mounted on the upper arm.

The finger guard may be assembled with bearings of the end pulleys and attached to an adapter frame cooperating with the profile frame, wherein the adapter frame is mounted to the lower arm of the profile frame and fastened.

The above conveyor assembly may further include a take-up unit for adjusting belt tensioning. The take-up unit may be integral with the drive unit. The drive unit may be operable to be shifted along the length of the profile frame to function as a head drive conveyor, center drive conveyor or end drive conveyor.

The profile frame may be made of a metal by an extrusion process. The profile frame may be made of aluminium.

The conveyor may be supported by a either support leg or pair of vertical hanging rods, wherein the pair of vertically hanging rods are attached and fastened to a horizontally positioned cross pipe, wherein both the ends of the cross pipe are attached and fastened to a cavity located on the lower arm of the profile frame.

BRIEF DESCRIPTION OF THE DRAWINGS

Embodiments of the invention will now be described with reference to the enclosed drawings, in which:

FIG. 1b is an exploded view of FIG. 1a;

FIG. 2 is a cross sectional view of the belt conveyor assembly of FIG. 1a;

FIG. 10 is a partial bottom view of the belt conveyor assembly of FIG. 1a; and

FIG. 11 is a sectional view of the belt conveyor assembly of FIG. 1a when mounted using hanging rods.

DETAILED DESCRIPTION

Figure 1A:
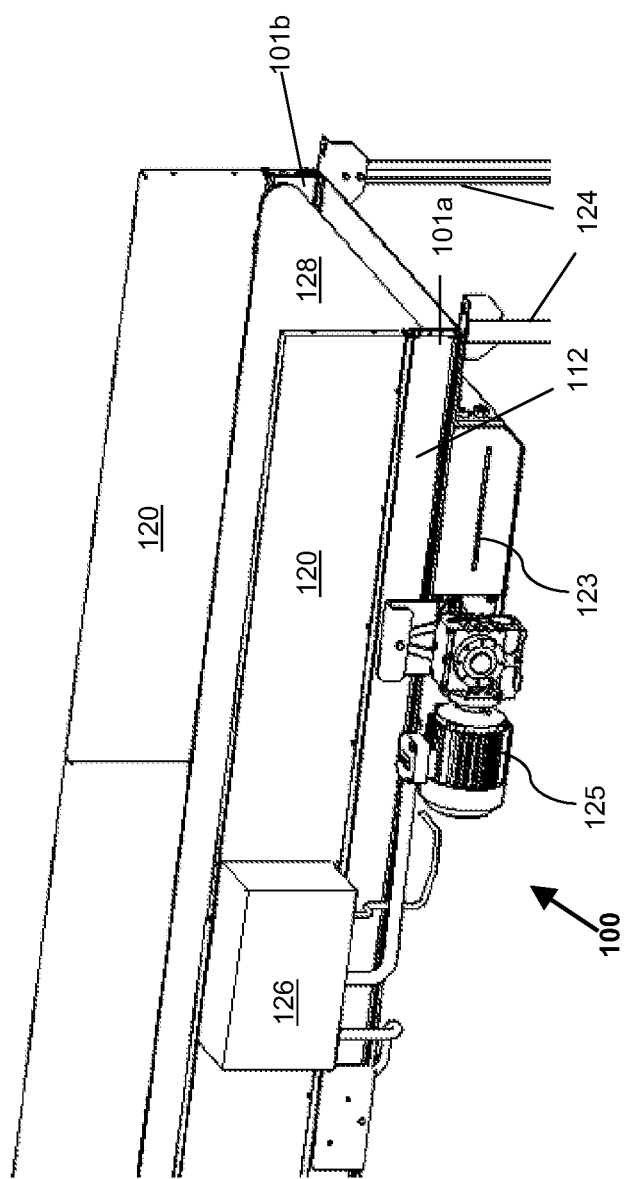
FIG. 1a is a perspective view of a belt conveyor assembly in accordance with an embodiment of the present invention.

Embodiments of the present invention provide a modular and light weight belt conveyor assembly. Embodiments of the present invention provide a belt conveyor assembly using profile frames onto which a drive unit inbuilt with a take-up unit, finger guards and other auxiliary components can be easily mounted.

Embodiments of the present invention can be applied to all types of belt conveyors. Embodiments of the present invention can help in standardizing the design of a belt conveyor assembly which in turn reduces manufacturing cost as well as the cost for design and installation. The modular design of the belt conveyor assembly as per embodiments of the present invention can also make it easy to install, dismantle and reinstall.

Since the drive unit according to embodiments of the invention is inbuilt with take-up unit, the number of components used in the conveyor assembly are reduced which in turn makes the assembly more compact. Embodiments of the present invention can help in saving energy and is therefore environmental friendly.

The dimensions of the profile frame according to embodiments of the invention are appropriately chosen to provide uniformity during extrusion as well as to provide structural strength and integrity while mounting a plurality of auxiliary components on the profile frame.

In embodiments of the present invention, a drive unit can be flexibly mounted and shifted any where along a length of the profile frame. Therefore, it is possible to achieve a belt conveyor that can function as a head drive conveyor, center drive conveyor or end drive conveyor by shifting the drive frame along the length of profile frame.

In embodiments of the present invention, hanging rods, support legs, platform and walkway can be mounted for example every 3 m or at any convenient location along the length of the belt conveyor assembly without any major modification in conveyor design.

In embodiments of the present invention, an end pulley is mounted together with a finger guard and external bearing within the conveyor frame thereby allowing easy access from below the conveyor system.

In embodiments of the present invention, the slider beds can be mounted to the vertical surface or the top surface of the profile frame. Furthermore, a plurality of bottom covers having the same dimensions can be used to cover the bottom surface of the belt conveyor system.

As there is no need for any additional machining or drilling on the profile frame, embodiments of the present invention provide a belt conveyor assembly with increased flexibility and ease of assembling/dismantling auxiliary components. In addition, embodiments of the present invention provide a profile frame having two separate hollow cavities for housing power cables and communication cables thereby eliminating cost for fabricating separate cable trunking.

Example embodiment of the present invention not only increases the aesthetic of the conveyor assembly but is also easier to maintain. Embodiments of the present invention can be tailored for different types of applications e.g. baggage handling in an airport.

FIG. 1a is a perspective view of a belt conveyor assembly 100 in accordance with an embodiment of the present invention. The belt conveyor assembly 100 includes two elongate profile frames 101a and 101b that are mounted in parallel, a conveyor belt 128 in between the profile frames 101a and 101b, side covers 112, and a plurality of auxiliary components that are removably mounted to the outer walls (refer FIG. 2) of the profile frame 101a and 101b at any position along the length of the profile frames 101a and 101b. Most of the auxiliary components are fabricated using e.g. steel.

In an embodiment shown in FIG. 1a, the belt conveyor assembly 100 consists of a plurality of upright side guards 120 mounted on the top surface of each of the profile frames 101a and 101b. Auxiliary components such as support legs 124, a drive gearmotor 125, and a drive frame assembly 123 are mounted to the bottom surface of the profile frames 101a and 101b. The drive gearmotor 125 is activated by a control box 126. The rotational movement of the drive gearmotor 125 is translated to the drive pulley 131 (refer FIG. 1b), which in turn drives the conveyer belt 128 via the take-up pulley 133 (refer FIG. 1b) of the drive frame assembly 123. The conveyor assembly 100 also includes end pulleys 122 (refer FIG. 1b), snub pulley 137 (refer FIG. 1b) and return rollers 135 assembly.

In an example embodiment, the position of the drive gearmotor 125 and the drive frame assembly 123 can be advantageously shifted along the length of the profile frame 101a, 101b to function as a head drive conveyor, center drive conveyor or end drive conveyor without any modification.

Figure 1B:
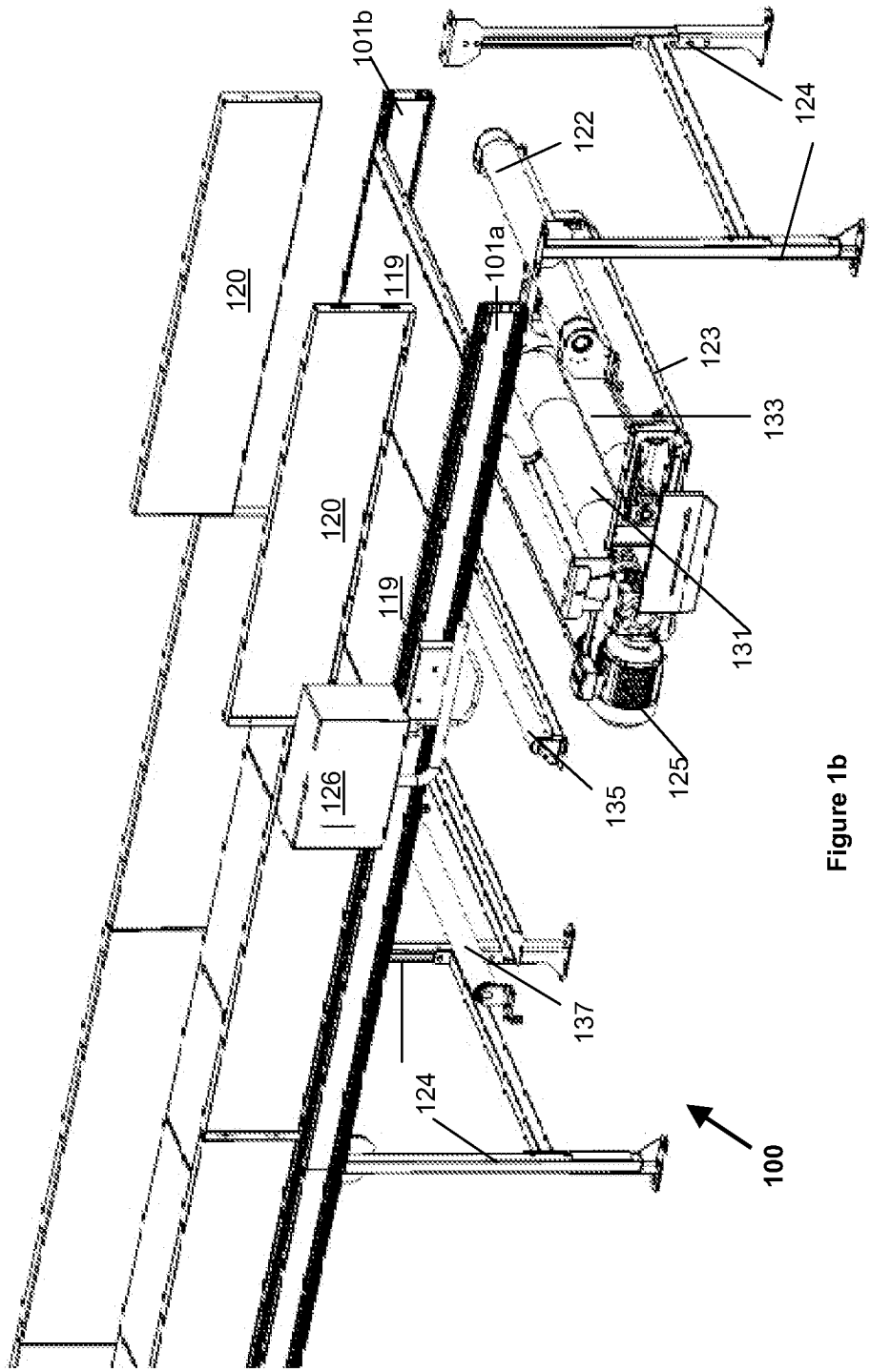

FIG. 1b is an exploded view of FIG. 1a without the belt 128, showing the slider beds 119.

Figure 2:
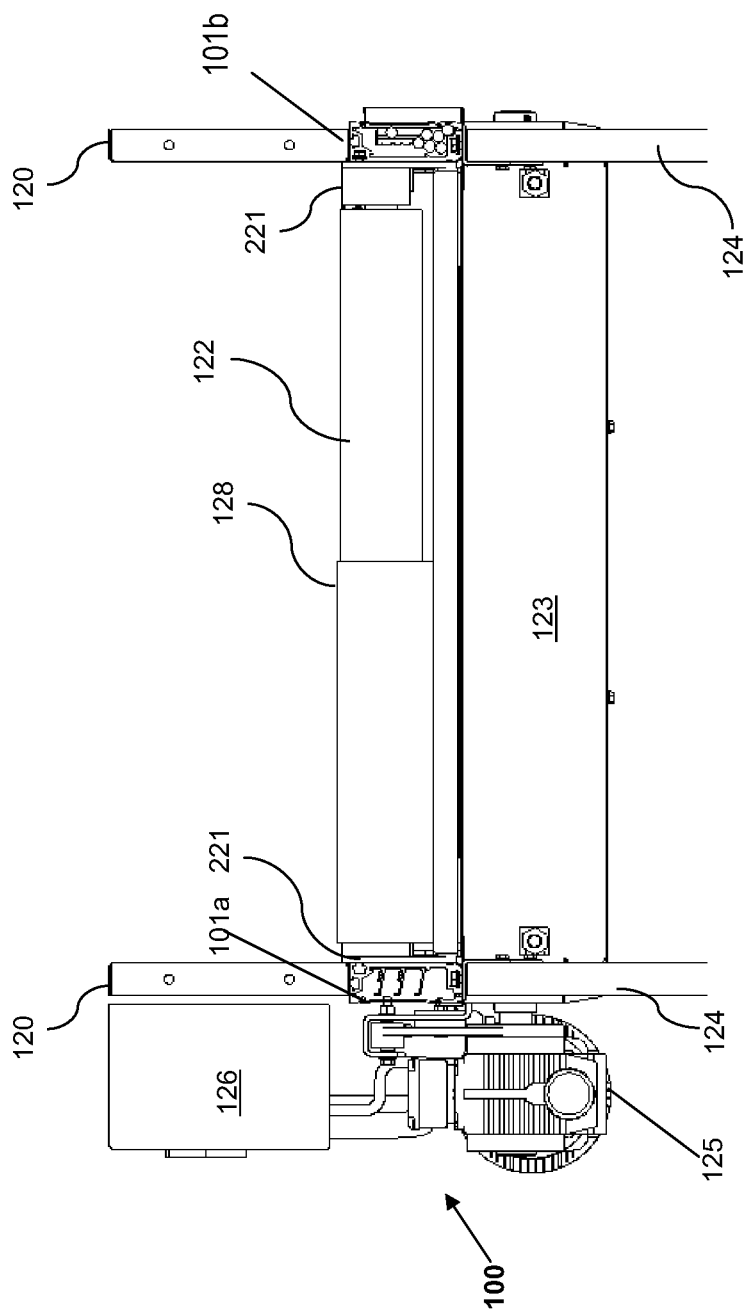

FIG. 2 is a sectional view of the belt conveyor assembly 100 of FIG. 1a with the conveyor belt 128. The view clearly shows the two profile frames 101a and 101b, side guards 120, support legs 124, drive gearmotor 125, control box 126, end pulley 122, finger guards 221, and the drive frame assembly 123.

Figure 6:
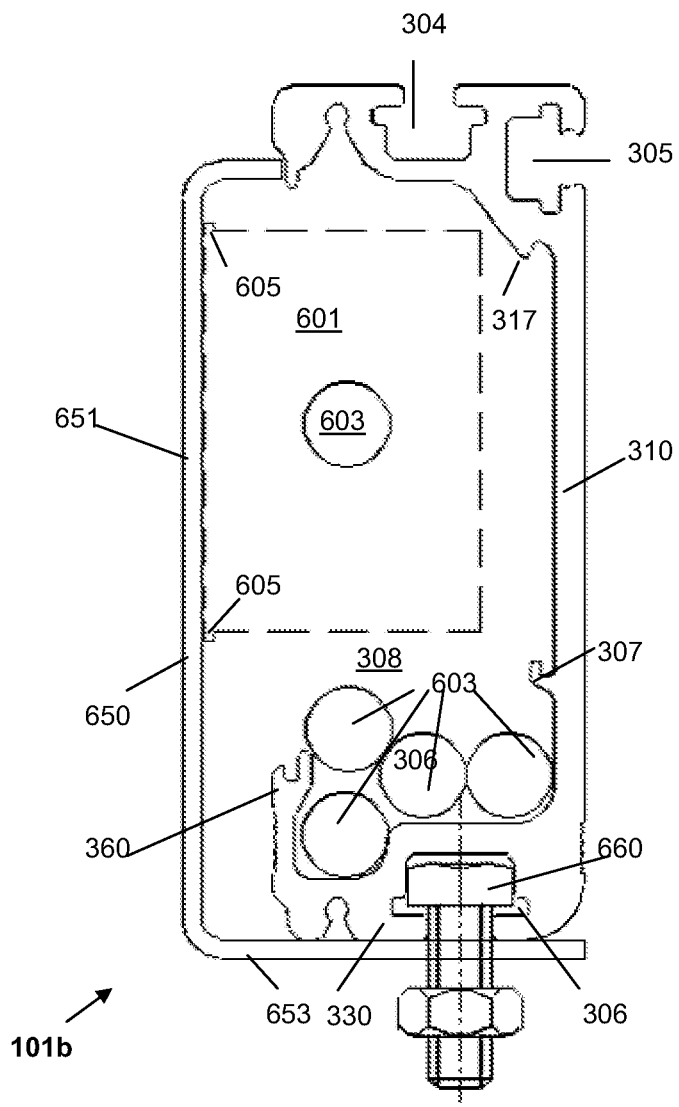
FIG. 6 is a sectional view (near power terminal box) with a mounting bracket and enclosing a power terminal box in accordance with an embodiment of the present invention.

In the embodiment, the profile frame 101a houses the communication cables (refer FIG. 4) while the profile frame 101b houses the power cables (refer FIG. 6).

The two end pulleys 122 assists in the movement of the conveyor belt. The finger guards 221 assist in protecting any object, fingers of a user from engaging with the moving parts e.g. the two end pulleys 122.

Figure 3:
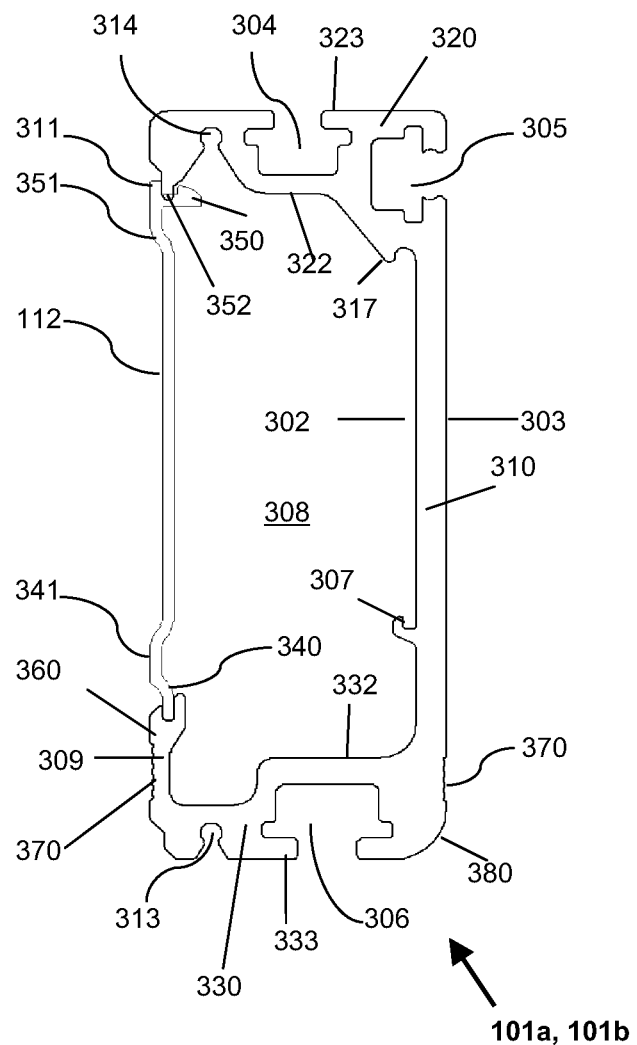
FIG. 3 is a cross sectional view of a profile frame of FIG. 1a in accordance with an embodiment of the present invention.

FIG. 3 is a sectional view of a profile frame 101a and 101b used in the belt conveyor assembly 100 of FIG. 1 in accordance with an embodiment of the present invention;

The profile frames 101a and 101b are made of a metal (e.g. aluminium) by an extrusion process. The profile frames 101a and 101b have a substantially C-shaped cross-section.

The C-shaped profile frames 101a and 101b consist of an upright portion 310, an upper arm 320 and a lower arm 330. The upright portion 310 includes a substantially flat inner wall 302 and a substantially flat outer wall 303. The upper arm 320 includes an inner wall 322 and an outer wall 323. The lower arm 330 includes an inner wall 332 and an outer wall 333.

Along the interior side, the profile frames 101a and 101b have a substantially hollow cavity 308. Along the exterior side, the profile frames 101a and 101b consists of a plurality of T-shaped cavities 304, 305 and 306. The cavity 304 is located on the upper arm 320, while the cavity 306 is located on the lower arm 330. The cavity 305 is located on the upright portion 310, near the junction of the upright portion and the upper arm 320.

The inner walls of the profile frames 101a, 101b formed by the outer surface 303 of the upright portion 310 is planar over its length and most of its height. Such planarity is necessary at least in a region where the conveyor belt 128 is positioned. The planar construction of the outer surface 303 of the upright portion 310 is advantageous to the conveyor assembly 100. For instance, the planar construction of the outer surface 303 of the upright portion 310 helps to eliminate any gap between slider beds 119 and the upper portion 310 (refer FIGS. 7a and 7b), which in turn helps in preventing the jamming of any small articles to the moving parts of the conveyor assembly 100.

Furthermore, the planar construction of the outer surface 303 of the upright portion 310 also helps in cooperating with the L-shaped frame 807 (refer FIG. 8) while assembling the finger guard 221 to the lower arm 330 of the profile frames 101a and 101b.

The cavities 304 and 305 are suitably designed to accommodate e.g. a standard M8 and 5/16" bolt while the cavity 306 is suitably designed to accommodate e.g. a standard M10 and 7/16" bolt. i.e. The cavities 304, 305 and 306 are appropriately designed to accommodate metric and imperial size bolts.

Since, the cavities 304, 305 and 306 are present along the entire length of the profile frames 101a and 101b, a plurality of auxiliary components can be flexibly mounted at any position along the length of the profile frames 101a and 101b by using the appropriate bolts. For example, the cavity 304 is used for mounting the side guards 120 (refer FIG. 7a). The cavity 305 for example is used for mounting the slider bed 119 (refer FIG. 7a). The cavity 306 for example is used for mounting a plurality of auxiliary components such as support legs 124 (refer FIG. 7a), cross bracing (not shown), return rollers 135 (refer FIG. 1b), finger guards 221 (refer FIG. 2), snub pulley 137 (refer FIG. 1b), drive frame assembly 123 (refer FIGS. 1a and 2) or bottom covers 1001 (refer FIG. 10).

Figure 4:
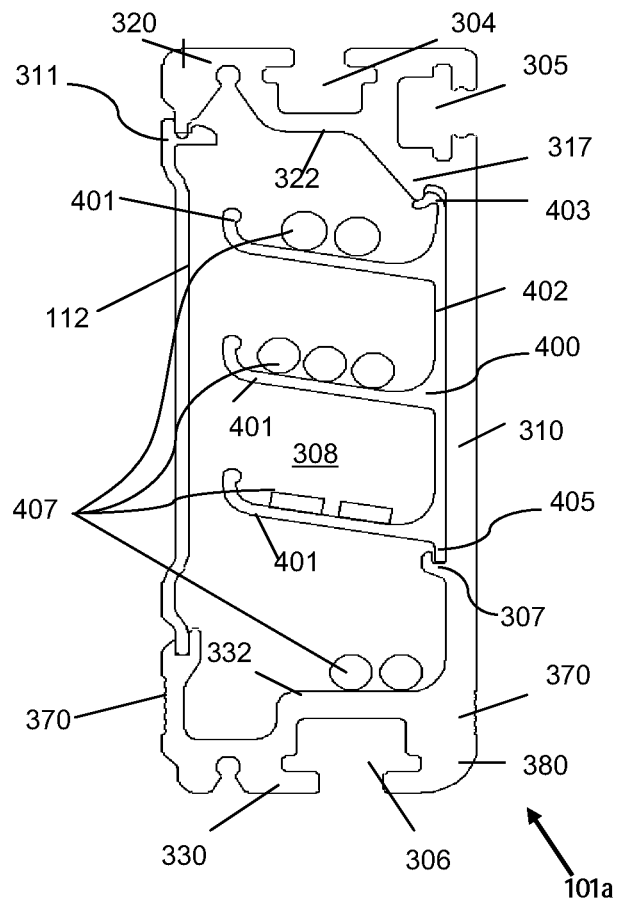
FIG. 4 is a cross sectional view of a profile frame of FIG. 3 when used for trunking communication cables in accordance with an embodiment of the present invention.
Figure 5:
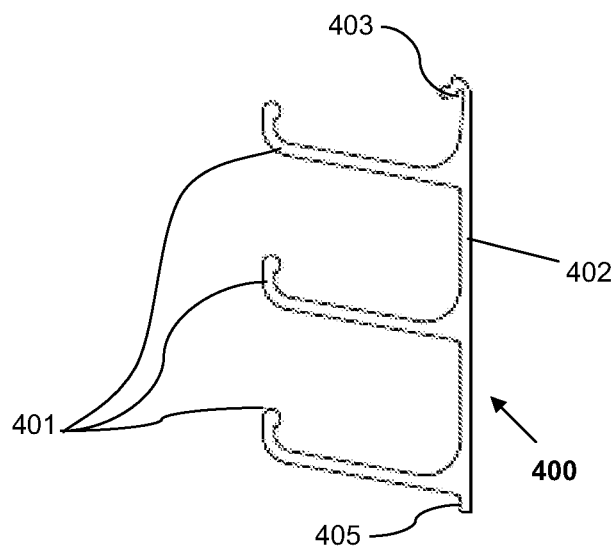
FIG. 5 is a cross sectional view of a cable separator used in FIG. 5.

The inner wall 302 of the upright arm 310 consists of a plurality of notches 307, 317 for accommodating a cable separator 400 (refer FIGS. 4 and 5). The distal end of the lower arm 330 has an upright wall 309, which terminates with a fork shaped structure 360 for positioning a side cover 112. The distal end of the upper arm 320 terminates as a locking pin 311.

A substantially flat side cover 112 is provided in order to protect the cables running through the profile frames 101a and 101b. The side cover 112 may be made of a flexible plastic material, such as PVC. The bottom edge 340 of the side cover 112 is substantially flat. The top edge 350 of the side cover 112 has an upright portion that has a slot 352 on its upper side. Proximate to the bottom edge 340 and the top edge 350, recessed portions 341 and 351 are provided. In order to install the side cover 112, the lower edge 340 of the side cover 112 is placed in between the arms of the fork shaped structure 360 and the upper edge 350 of the side cover 112 is pushed towards the center of the cavity 308 until the slot 352 engages and locks with the locking pin 311. To open the side cover, the upper edge 350 is pushed down so that the slot 352 disengages with the locking pin 311.

The profile frames 101a and 101b further include two cavities 313, 314 that extend along the length of the profile frames 101a, 101b. A first cavity 313 is provided on the outer wall 333 of the lower arm 330 and a second cavity 314 is provided on the inner wall 322 of the upper arm 320. Through these cavities 313, 314, an end cover (not shown) may be inserted to cover the frame of a last conveyor (not shown).

The outer surface of the junction of the upright portion 310 and the lower arm 330 has a rounded corner 380 in order to co-operate with the L-shaped frame 807 (refer FIG. 8) while mounting the finger guard 221 to the profile frame 101a, 101b. Along the length of the profile frame 101a, 101b, striped lines 370 are provided on the upright wall adjacent to the fork shaped structure 360 and on the upright portion 310 adjacent to the rounded corner 380. The striped lines improve aesthetics and reduce scratches.

The conveyor assembly 100 consists of two elongate profile frames 101a and 101b that are placed in parallel with a distance in between assembly to accommodate the conveyor belt 128. In the present embodiment, one profile frame 101b is used as trunking for power cables 603 (refer FIG. 6) and positioning for power terminal box 601. Another profile frame 101a (refer FIG. 4) is used for trunking communication cables 407 via a cable separator 400 (refer FIG. 5).

FIG. 4 is a sectional view of a profile frame 101a of FIG. 3 when used for trunking communication cables 407 in accordance with an embodiment of the present invention. A plurality of communication cables 407 are housed in a cable separator 400. The cable separator 400 has an upright portion 402 having a hook-like upper edge 403 and a straight lower edge 405. On one side, the upright portion 402 has a plurality of racks 401 that are substantially perpendicular to the upright portion 402. The racks 401 may be positioned at an angle of e.g. 80° with respect to the upright portion 402.

In order to mount the cable separator 400, the lower edge 405 is inserted into the notch 307 and the cable separator 400 is pushed towards the inner wall 302 until the hook-like upper edge 403 locks with the notch 317. Each of the racks 401 are used for trunking communication cables 407. The communication cables 407 are physically separated by the racks 401 to avoid interference.

FIG. 5 is a sectional view of a cable separator used in FIG. 5 showing the racks 401, the upright portion 402, the hook-like upper edge 403 and the lower edge 405. The cable separator may be made of a flexible plastic material e.g. PVC for easy mounting.

FIG. 6 is a sectional view (near power terminal box) with a mounting bracket and enclosing a power terminal box in accordance with an embodiment of the present invention.

At one side of profile frame 101b, the inner wall of the upright portion 310 may include a plurality of notches 307, 317 for accommodating a cable separator 400 (Refer FIG. 5). At the other side of profile frame 101b, power cables 603 are trunked along the vacant portion of the profile frame below the power terminal box 601. Power terminal box 601 is mounted to the lower arm of the profile frame 101b by the help of a mounting bracket 650. A power terminal box is mounted along the hollow cavity such that the available free space for trunking the power cables is about 50% of the hollow cavity. Separating the power cables 603 and the communication signal cables 407 reduces noise disturbance in operational condition.

A power terminal box 601 is mounted along the hollow cavity 308 such that the available free space for trunking the power cables 401 is about 50% of the hollow cavity 308. Each conveyer assembly 100 has at least one power terminal box 601 for branching or distributing power to other conveyor assembly 100 from main power source.

The L-shaped bracket 650 is made of e.g. steel. The L-shaped bracket 650 has a longer arm 651 and a shorter arm 653 that are substantially perpendicular. The power terminal box is mounted to the longer arm 651 by e.g. screws (not shown). The shorter arm 653 is mounted to the cavity 306 of the profile frame 101b using e.g. a standard 7/16" bolt.

Figure 7A:
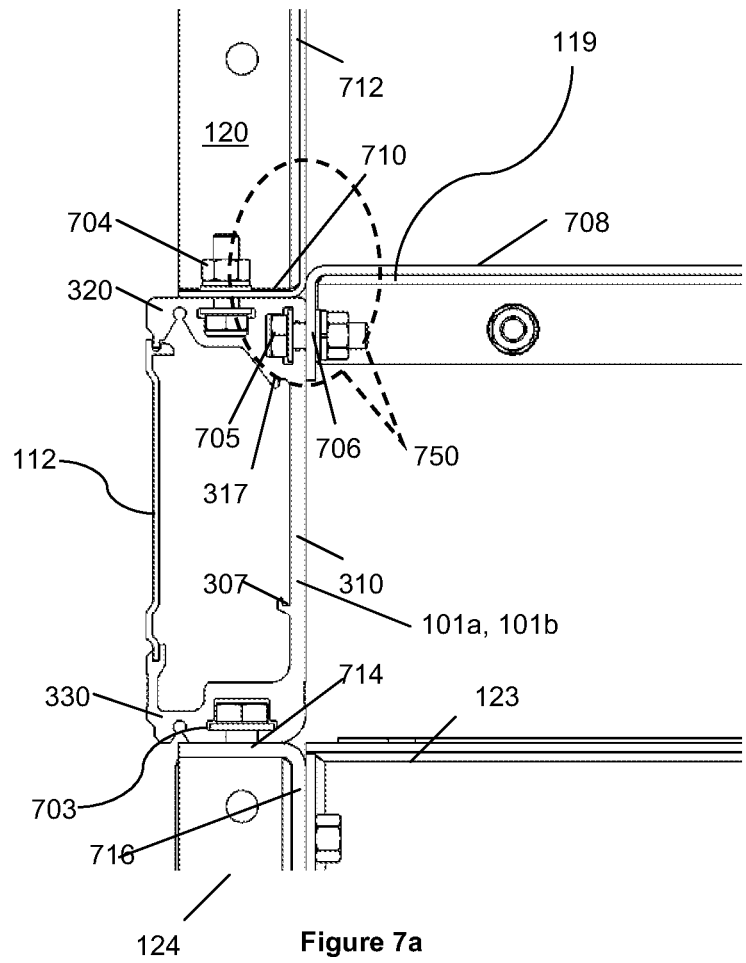
FIG. 7a is a partial sectional view of FIG. 2 showing the mounting of auxiliary components to the profile frame in accordance with an embodiment of the present invention.

FIG. 7a is a partial sectional view of FIG. 2 showing the mounting of auxiliary components to the profile frame 101a, 101b in accordance with an embodiment of the present invention.

A slider bed 119 is positioned substantially on the upright portion 310 in between the profile frame 101a, 101b. The slider bed 119 provides support and mechanical strength for the conveyor belt 128 when conveying e.g. a baggage. The slider bed 119 has a support surface 708 and two abutment ends 706 which are substantially perpendicular to the support surface 708 at each end. The two abutment ends 706 has a plurality of holes (not shown) through which e.g. standard M8 and 5/16" bolts 705 are inserted. The head of the bolts 705 are accommodated inside the T-shaped cavity 305 of the profile frame 101a, 101b and the bolts 705 are fastened.

A side guard 120 is positioned substantially to the entire length of the upper arm 320 of the profile frame 101a, 101b. The side guard 120 has an upright wall 712 and an abutment end 710 which is substantially perpendicular to the upright wall 712. The abutment end 710 has a plurality of holes (not shown) through which e.g. standard M8 and 5/16" bolts 704 are inserted. The head of the bolts 704 are accommodated inside the T-shaped cavity 304 of the profile frame 101a, 101b and the bolts 704 are fastened.

At least two support legs 124 are positioned at both ends of entire conveyor length on the lower arm 330 of the profile frame 101a, 101b. Each support leg 124 has standing support structure 716 which stands on floor surface and an abutment end 714 which is substantially perpendicular to the standing support structure 716. The abutment end 714 has at least a hole (not shown) through which e.g. standard M10 and 7/16"

bolts 703 are inserted. The head of the bolts 703 are accommodated inside the T-shaped cavity 306 of the profile frame 101a, 101b and the bolts 703 are fastened. Apart from the support legs, finger guards 221 (refer FIG. 8), drive gearmotor 125, drive frame assembly 123, end pulley 122 etc are mounted to the lower arm 330 of the profile frame 101a, 101b via the T-shaped cavity 306.

Figure 7B:
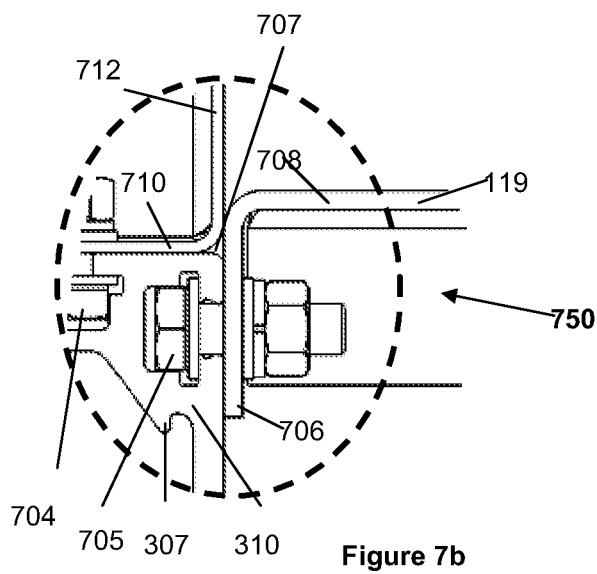
FIG. 7b is a detailed view of a portion of FIG. 7a in accordance with an embodiment of the present invention.

FIG. 7b is a detailed view of a portion 750 of FIG. 7a in accordance with an embodiment of the present invention. In this embodiment the slider bed 119 is mounted at about 10 mm higher than the profile frame 101a, 101b in order to reduce the gap 707 between the junctions of the profile frame 101a. 101b, the side guard 120 and the slider bed 119. Reduction in the gap 707 advantageously helps in preventing the jamming of baggage strip or any small conveying articles to the conveyor assembly 100.

Figure 7C:
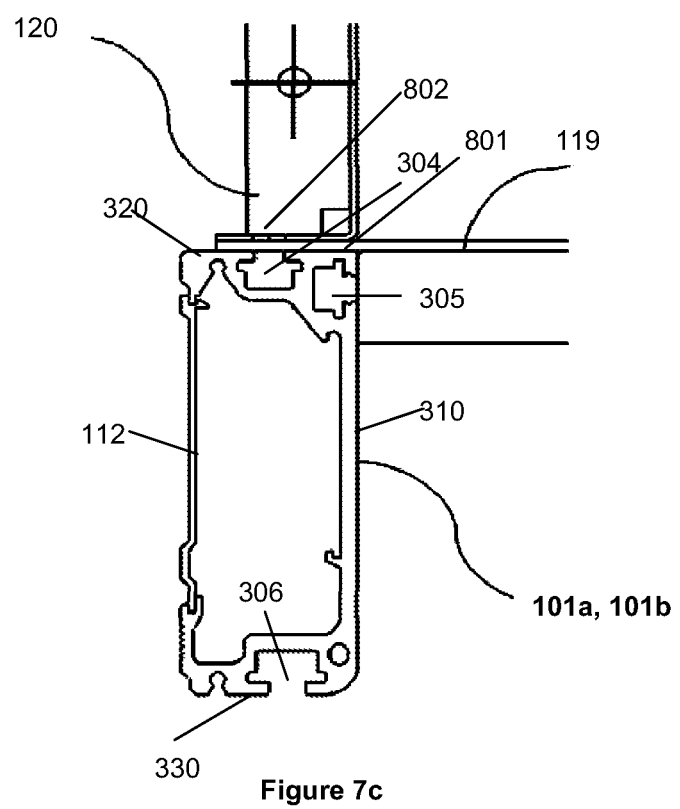
FIG. 7c a partial sectional view showing an alternate way of mounting a slider bed to the profile frame of FIG. 3 in accordance with an embodiment of the present invention.

FIG. 7c a partial sectional view showing an alternate way of mounting a slider bed 119 to the profile frame 101a, 101b in accordance with an embodiment of the present invention. The slider bed 119 has a straight edge 801 which is mounted above the upper arm 320. An abutment end 802 of the side guard 120 is mounted on top of the straight edge 801. The straight edge 801 of the slider bed 119 and the abutment end 802 of the side guard 120 are fastened using e.g. standard M8 and 5/16" bolts.

Figure 8:
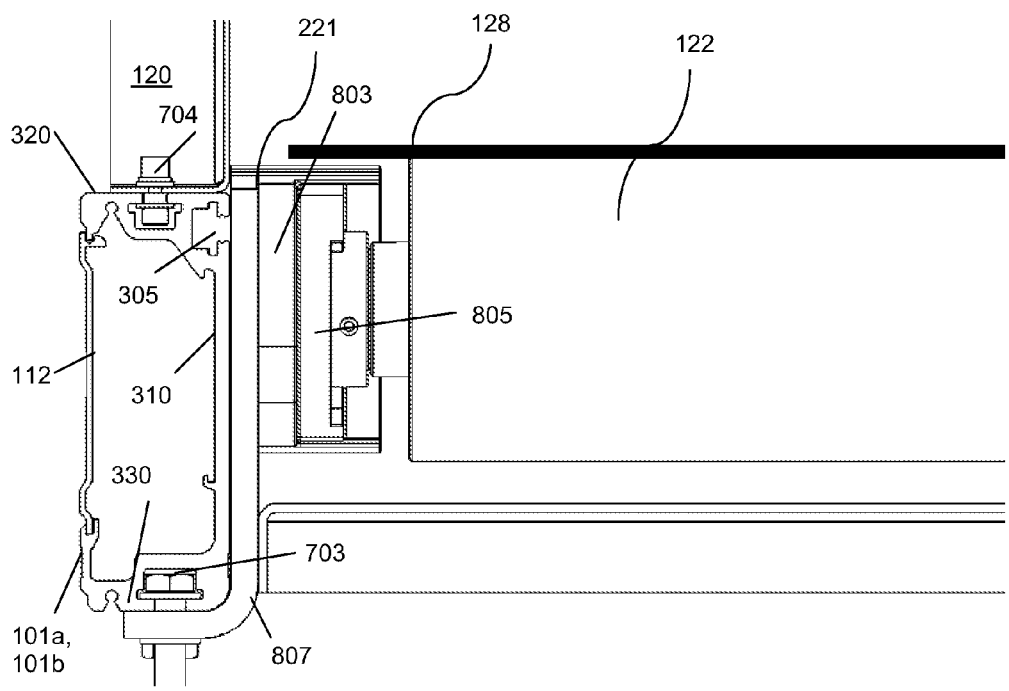
FIG. 8 is a partial sectional view of FIG. 2 showing the mounting of an end pulley and bearing to the profile frame of FIG. 3 in accordance with an embodiment of the present invention.

FIG. 8 is another partial sectional view of FIG. 2 showing the mounting of end pulley 122 and bearing 805 to the profile frame 101a, 101b of FIG. 3 in accordance with an embodiment of the present invention.

Adjacent to the end pulley 122, gaps can occur between the conveyor belt 128 and the moving parts of the conveyor assembly especially the bearing assembly 805 driving the end pulley 122. These gaps can be harmful as a finger of the user or any small article can get jammed to the moving parts. In order to prevent this, a finger guard 221 is used.

The finger guard 221 has a hooded structure 803 and is fitted to the lower arm 330 of the profile frame 101a, 101b via an L-shaped frame 807 made of e.g. steel. The finger guard 221 and the L-shaped frame 807 are fastened to the cavity 306 using e.g. standard M10 or 7/16" bolts 706. The finger guard 221 can be easily assembled and dismantled from the bottom side of the conveyor assembly 100. Furthermore, since the bearing 805, end pulley 122 and the finger guard 221 can be easily dismantled as one unit; replacement of bearing 805 can be easily done without damaging the conveyor body.

Figure 9:
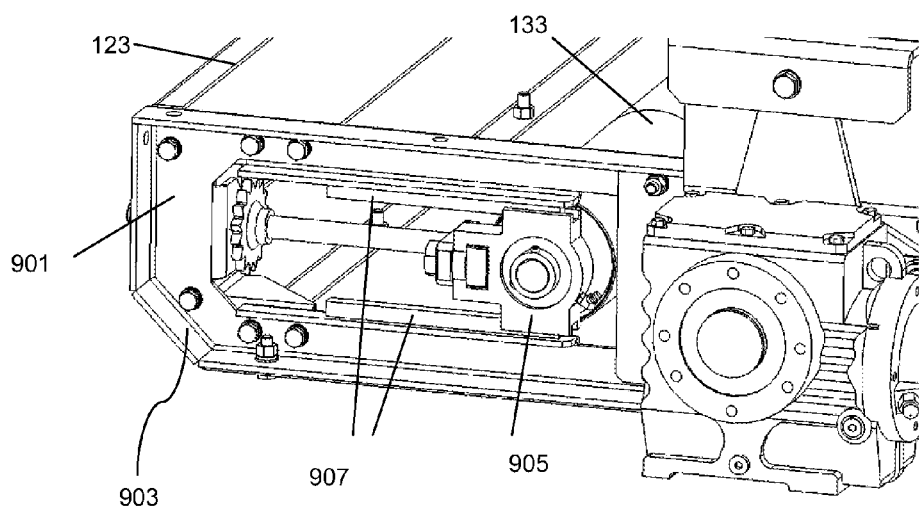
FIG. 9 is a partial perspective view of a drive unit in built with a take-up unit in accordance with an embodiment of the present invention.

FIG. 9 is a partial perspective view (without a side cover) of a drive unit 901 in built with a take-up unit 905 in accordance with an embodiment of the present invention. Opposing elongate bars 907 having a cross section of a square are provided within the drive frame 903 in order to easily adjust take up unit 905 for belt tracking. The assembly of drive unit 901 in built with the take-up unit 905 is fitted to the lower arm 330 of the profile frame 101a, 101b (refer FIGS. 1 and 2).

Figure 10:
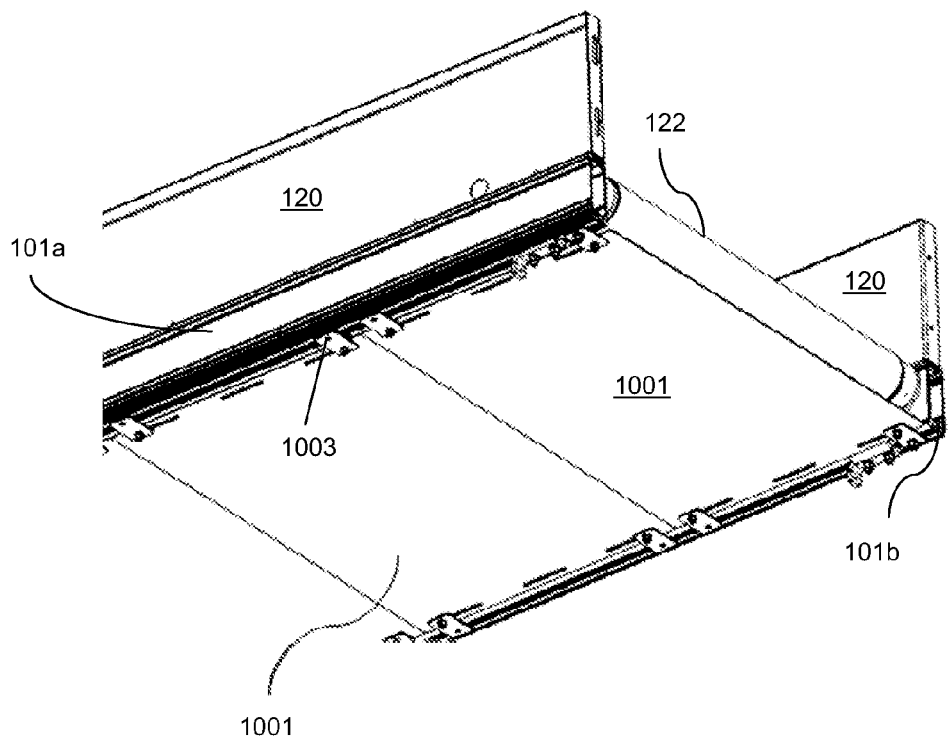

FIG. 10 is a partial bottom view of the belt conveyor assembly of FIG. 1 showing a plurality of identical bottom covers 1001 that are mounted to the lower arm 330 of the profile frame 101a, 101b using brackets 1003 and fastened with e.g. standard M10 or 7/16" bolts.

FIG. 11 is a sectional view of the belt conveyor assembly 100 of FIG. 1a when mounted using hanging rods 1101. Where support legs 124 are not suitable for mounting a conveyor assembly 100, hanging rods 1101 mounted e.g. to a ceiling are used to support a conveyor assembly 100. Pairs of vertically hanging rods 1101 are attached to a horizontally positioned cross pipe 1103 and fastened using bolts 1150. Both ends of the cross pipe 1103 are attached to a respective profile frame 101a and 101b and fastened by bolts 1160. A pair of hanging rods is provided for every 3 m length of the conveyor assembly 100.

It will be appreciated by a person skilled in the art that numerous variations and/or modifications may be made to the present invention as shown in the specific embodiments without departing from the scope of the invention as broadly described. The present embodiments are, therefore, to be considered in all respects to be illustrative and not restrictive.

What is claimed is:

1. A belt conveyor assembly comprising:
a pair of elongate profile frames that are mounted in parallel;
a conveyor belt positioned in between the profile frames; and
a plurality of auxiliary components removably mounted to outer walls of the profile frames at any position along the length of the profile frames;
wherein the surface of the inner walls of the profile frames are planar over their length and height at least in a region where the conveyor belt is positioned, and
wherein the auxiliary components include:
a plurality of suitably positioned support legs on which the profile frames are mounted;
slider beds positioned along the length of the profile frames for supporting the conveyor belt;
side guards positioned along the length of the profile frames;
a drive unit for driving a drive pulley, wherein the drive pulley drives the conveyor belt; and
finger guards mounted to bearings on both the ends of the end pulleys;
wherein the support legs, slider beds, side guards, the drive unit and the finger guards are removably mounted to outer walls of the profile frames at any position along the length of the profile frames.

2. The belt conveyor assembly according to claim 1, wherein the side guards are mounted to the upper arm of the profile frame.

3. The belt conveyor assembly according to claim 1, wherein the slider beds are mounted to the upright portion of the profile frame.

4. The belt conveyor assembly according to claim 1, wherein the slider beds are mounted to the upper arm of the profile frame.

5. The belt conveyor assembly according to claim 1, wherein the support legs, drive unit and the finger guards are mounted to lower arm of the profile frame.

6. The belt conveyor assembly according to claim 1, wherein the auxiliary components further comprises cross bracing, return rollers, snub pulley or a plurality of identical bottom covers.

7. The belt conveyor assembly according to claim 6, wherein the cross bracing and bottom covers are mounted to the lower arm of the profile frame.

8. The belt conveyor assembly according to claim 6, wherein the return rollers and snub pulley are mounted to the lower arm of the profile frame.

9. The belt conveyor assembly according to claim 1, wherein the slider bed is mounted to the upright arm at about 10 mm higher than the profile frame.

10. The belt conveyor assembly according to claim 1, wherein the slider bed is mounted on the upper arm.

11. The belt conveyor assembly according to claim 1, wherein the finger guard is integrated with bearings of the end pulleys and attached to an adapter frame cooperating with the profile frame, wherein the adapter frame is mounted to the lower arm of the profile frame and fastened.

12. The belt conveyor assembly according to claim 1, wherein a drive unit is integrated with take up unit to become a modular drive unit.

13. The belt conveyor assembly according to claim 12, wherein take up unit is adjustable for belt tensioning.

14. The belt conveyor assembly according to claim 12, wherein the modular drive unit integrated with take up unit is operable to be shifted along the length of the profile frame to function as a head drive conveyor, center drive conveyor or end drive conveyor.

15. The belt conveyor assembly according to claim 1, wherein the support legs are replaceable with pairs of vertical hanging rods, wherein the pairs of vertically hanging rods are attached and fastened to a horizontally positioned cross pipe, wherein both the ends of the cross pipe are attached and fastened to a cavity located on the lower arm of the profile frame.

16. A belt conveyor assembly comprising:
a pair of elongate profile frames that are mounted in parallel;
a conveyor belt positioned in between the profile frames; and
a plurality of auxiliary components removably mounted to outer walls of the profile frames at any position along the length of the profile frames;
wherein the surface of the inner walls of the profile frames are planar over their length and height at least in a region where the conveyor belt is positioned, and
wherein the profile frames include a substantially C-shaped structure comprising:
an upright portion;
an upper arm; and
a lower arm;
wherein the interior side of the profile frame is substantially hollow,
wherein on the exterior side of the upright portion, upper arm and lower arm comprises one or more cavities along the length of the profile frames, wherein the cavity on the upright portion is located near the junction of the upper arm and the upright portion,
wherein the outer surface upright portion is planar over its length and height at least in a region where the conveyor belt is positioned, and
wherein each of the plurality of auxiliary components are removably mounted to a respective cavity located on the upper arm, lower arm and the upright portion of the profile frame.

17. The belt conveyor assembly according to claim 16, wherein each of the cavities located on the upper arm, lower arm and the upright portion of the profile frame has a T-shape cross-section.

18. The belt conveyor assembly according to claim 16, wherein the cavities located on the upper arm, lower arm and the upright portion of the profile frame accommodate a bolt for fastening the auxiliary components to the profile frames.

19. The belt conveyor assembly according to claim 18, wherein the bolt used for fastening the auxiliary components to the upper arm and upright portion is a standard M8 or 5/16" and the bolt used for fastening the auxiliary components to the lower arm is a standard M10 or 7/16" bolt.

20. The belt conveyor assembly according to claim 16, wherein the hollow sections of the interior side of the profile frames accommodate power cables and communication signal cables.

21. The belt conveyor assembly according to claim 20, wherein the power cables are accommodated in one hollow section of the interior side of the profile frames and communication signal cables are accommodated in another hollow section of the interior side of the profile frames.

22. The belt conveyor assembly according to claim 16, wherein inner wall of the upright portion comprises a plurality of notches for accommodating a cable separator.

23. The belt conveyor assembly according to claim 22, wherein the cable separator comprises:
an upright portion having edges that co-operate and lock with the notches provided on the inner wall of the upright arm; and a plurality of racks, wherein communication cables are trunked on the racks.

24. The belt conveyor assembly according to claim 16, wherein distal end of the upper arm further comprises a locator pin, wherein the distal end of the lower arm comprises a forked structure, wherein a cover is inserted into the forked structure and locked when the locking pin encounters a slot provided on the upper edge of the cover.

25. The belt conveyor assembly according to claim 16, wherein the profile frames further comprises a plurality of cavities on the inner or outer walls of the upper arm or the lower arm for mounting an end cover to cover the frame of a last conveyor.

26. The belt conveyor assembly according to claim 16, wherein the outer surface of the junction of the upright portion and the lower arm has a rounded corner for co-operating with the frame of finger guard during mounting.

27. A belt conveyor assembly comprising:
a pair of elongate profile frames that are mounted in parallel;
a conveyor belt positioned in between the profile frames; and
a plurality of auxiliary components removably mounted to outer walls of the profile frames at any position along the length of the profile frames;
wherein the surface of the inner walls of the profile frames are planar over their length and height at least in a region where the conveyor belt is positioned, and
wherein the profile frames comprise a substantially C-shaped structure comprising:
an upright portion;
an upper arm; and
a lower arm;
wherein the interior side of the profile frame is substantially hollow,
wherein on the exterior side of the upright portion, upper arm and lower arm comprises one or more cavities along the length of the profile frames, wherein the cavity on the upright portion is located near the junction of the upper arm and the upright portion, wherein the outer surface upright portion is planar over its length and height at least in a region where the conveyor belt is positioned, and
wherein each of the plurality of auxiliary components are removably mounted to a respective cavity located on the upper arm, lower arm and the upright portion of the profile frame, and
wherein along the length of the profile frames striped lines are provided on the outer surfaces of the upright portion and the lower arm.

28. A belt conveyor assembly comprising:
a pair of elongate profile frames that are mounted in parallel;
a conveyor belt positioned in between the profile frames; and a plurality of auxiliary components removably mounted to outer walls of the profile frames at any position along the length of the profile frames;

wherein the surface of the inner walls of the profile frames are planar over their length and height at least in a region where the conveyor belt is positioned, and wherein the profile frames comprise a substantially C-shaped structure comprising:

an upright portion;

an upper arm; and a lower arm;

wherein the interior side of the profile frame is substantially hollow, wherein on the exterior side of the upright portion, upper arm and lower arm comprises one or more cavities along the length of the profile frames, wherein the cavity on the upright portion is located near the junction of the upper arm and the upright portion, wherein the outer surface upright portion is planar over its length and height at least in a region where the conveyor belt is positioned, and wherein each of the plurality of auxiliary components are removably mounted to a respective cavity located on the upper arm, lower arm and the upright portion of the profile frame, and wherein the profile frame is made of a metal by an extrusion process.

29. The belt conveyor assembly according claim 28, wherein the profile frame is made of aluminium.

* * * * *